United States Patent
Yamaguchi et al.

(10) Patent No.: US 6,819,084 B2
(45) Date of Patent: Nov. 16, 2004

(54) METHOD OF FABRICATING RECHARGEABLE LITHIUM BATTERY AND RECHARGEABLE LITHIUM BATTERY FABRICATED BY SAME

(75) Inventors: Takitaro Yamaguchi, Yokohama (JP); Ryuichi Shimizu, Yokohama (JP); Cheol-Soo Jung, Ohsan (KR)

(73) Assignee: Samsung SDI Co., Ltd., Suwon (KR)

( * ) Notice: Subject to any disclaimer, the term of this patent is extended or adjusted under 35 U.S.C. 154(b) by 91 days.

(21) Appl. No.: 10/302,678

(22) Filed: Nov. 22, 2002

(65) Prior Publication Data

US 2003/0104272 A1 Jun. 5, 2003

(30) Foreign Application Priority Data

Dec. 3, 2001 (JP) .......................................... 2001-369367

(51) Int. Cl.⁷ ............................. H02J 7/00; H01M 6/14; H01M 6/00

(52) U.S. Cl. ........................ 320/139; 429/300; 29/623.1
(58) Field of Search .......................... 320/139; 429/300, 429/303, 304, 321, 322; 29/623.1

(56) References Cited

U.S. PATENT DOCUMENTS 6,664,006 B1 * 12/2003 Munshi ...................... 429/305

* cited by examiner

*Primary Examiner*—Pia Tibbits
(74) *Attorney, Agent, or Firm*—Christie, Parker & Hale, LLP (57) ABSTRACT

Disclosed is a method of fabricating a rechargeable lithium battery and a rechargeable lithium battery fabricated by the same. In this method, an electrolyte is placed between a positive electrode and a negative electrode to prepare an electrode element, and the electrode element is pulse charged.

38 Claims, 3 Drawing Sheets

METHOD OF FABRICATING RECHARGEABLE LITHIUM BATTERY AND RECHARGEABLE LITHIUM BATTERY FABRICATED BY SAME

CROSS REFERENCE TO RELATED APPLICATION

This application is based on and claims priority of Japanese Patent application No. 2001-369367, filed in the Japan Patent Office on Dec. 3, 2001, the disclosure of which is incorporated hereinto by reference.

BACKGROUND OF THE INVENTION (a) Field of the Invention

The present invention relates to a method of fabricating a rechargeable lithium battery, and a rechargeable lithium battery fabricated by the same.

(b) Description of the Related Art

The demand for rechargeable lithium batteries having a high energy density and a longer cycle-life is increasing as the use of portable electronic instruments such as portable phones, camcorders, and notebook computers increases.

One of the known factors that shortens the cycle-life is decomposition of an electrolyte caused by direct contact between a negative electrode and the electrolyte.

One attempt at preventing such decomposition of the electrolyte involved adding at least one anionic polymerizable monomer to the electrolyte. During charging, the monomer is polymerized to form a polymer layer on the surface of the negative electrode, which prevents the direct contact between the negative electrode and the electrolyte, thereby inhibiting the decomposition of the electrolyte.

However, in order to sufficiently inhibit the decomposition of the electrolyte, an excessively thick layer is required which results in the decrease of conductivity of lithium ions. Such a decreased conductivity deteriorates battery performance factors such as charge and discharge efficiency, high rate discharge characteristics, and low temperature characteristics.

SUMMARY OF THE INVENTION

In one embodiment, the invention is directed to a method of fabricating a rechargeable lithium battery. In this method, an electrolyte including a polymerizable monomer is placed between a positive electrode and a negative electrode to prepare an electrode element. The electrode element is pulse charged. The pulse voltage includes a base potential $E1$ and a pulse potential $E2$. Herein, the potential refers to a voltage which is proportional to a lithium metal reference electrode potential. The base potential $E1$ refers to a voltage at which the transfer of electrons from the negative electrode to the polymerizable monomer does not occur, and the pulse potential $E2$ refers to a voltage at which the transfer of electrons from the negative electrode to the polymerizable monomer occurs.

Alternatively, the electrode element may be further charged at a constant current until the potential of the negative electrode reaches the base potential $E1$ prior to the pulse charge. Alternatively, the electrode element may be further charged at a constant current (formation step).

Alternatively, the charging step is performed by first pulse-charging wherein the base potential $E1$ of the negative electrode and the pulse potential $E2$ are alternated, and by second pulse-charging where a base potential $E3$ and a pulse potential $E4$ are alternated.

The charging step may be performed by applying a battery voltage ($V1$ and $V2$) corresponding to the potential of the negative electrode rather than the potential which is proportional to the lithium metal reference electrode potential.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

The present invention provides a method of fabricating a rechargeable lithium battery. In this method, an electrolyte including a polymerizable monomer is placed between a positive electrode and a negative electrode to form an electrode element. The electrode element is pulse charged. The pulse charging is performed by alternating a base potential $E1$ and a pulse potential $E2$. Herein, the potential refers to a voltage which is proportional to a lithium metal reference electrode potential. The base potential $E1$ refers to a voltage at which the transfer of electrons from the negative electrode does not occur, and the pulse potential $E2$ refers to a voltage at which the transfer of electrons from the negative electrode occurs.

Alternatively, the electrode element may be further charged at a constant current until the potential of the negative electrode reaches the base potential $E1$, prior to the pulse charge, or alternatively, the electrode element may be further charged at a constant current (formation step), before the pulse charge.

As a further alternatively, the pulse charging may be performed by applying a first pulse voltage while the base potential $E1$ of the negative electrode $E1$ and the pulse potential $E2$ are alternated, and by applying a second pulse voltage while a base potential $E3$ and a pulse potential $E4$ are alternated.

The charging also may be performed by applying a battery voltage ($V1$ and $V2$) corresponding to the potential of the negative electrode.

According to the present invention, a potential at which the transfer of electrons to the polymerizable monomer from the negative electrode occurs ($E2$) and a potential at which the transfer of electrons to the polymerizable monomer from the electrode does not occur $E1$ are alternatingly applied to the electrode element, to prevent an excessive amount of electrons to the polymerizable monomer.

As a result, an organic layer with uneven thickness from the polymerizable monomer is not deposited on the negative electrode, and thus, a layer with the good conductivity can be coated on the surface of the negative electrode in a suitable thickness.

After forming the electrode element, and prior to the application of the pulse voltage, it is preferred to perform a heat-treatment at 40 to 120° C.

The heat-treatment serves to adhere the polymerizable monomer to the surface of the negative electrode, so that the electrons are effectively transferred from the negative electrode to the polymerizable monomer during the application of the pulse voltage. In addition, the gelation of the electrolyte depends on the type and concentration of the polymerizable monomer.

Preferably, a constant-current charging may further be performed by charging the potential of the negative electrode to a predetermined potential E5, and a constant-voltage charging may further be performed while the potential E5 is maintained.

Accordingly, the present invention can fabricate rechargeable lithium batteries with sufficient battery voltage. In addition, the organic layer prevents the direct contact between the electrolyte and the negative electrode and inhibits the decomposition of the electrolyte during the constant-current charging and constant-voltage charging.

The difference gap between the base potential E1 and the pulse potential E2 is preferably at least 0.2V, and more preferably 0.2 to 1.0V; and the difference gap between the base voltage V1 and the pulse voltage V2 is preferably at least 0.2V, and more preferably 0.2 to 1.5V. That is, the difference gap between the base potential E1 and the pulse potential E2 is sufficient to control the transfer of the electrons from the negative electrode to the polymerizable monomer as well as to easily control the formation of the organic layer.

During the application of the pulse voltage, the pulse charging preferably has a square wave shape or a triangle wave shape. Most preferred is the square wave shape since a rise from the base potential E1 to the pulse potential E2 abruptly occurs. Such an abrupt rise effectively controls the transfer of the electrons and initiates polymerization for forming the organic layer on the negative electrode.

The polymerizable monomer may be selected from anionic polymerizable monomers, such as methacrylonitrile, acrylonitrile, or polyacrylate with at least two functional groups. A polyacrylate with at least two functional groups may be composed of acrylate systems with polyether or polyester.

The electrolyte preferably further includes acetonitrile together with the monomer. Acetonitrile helps to improve lithium ionic conductivity of the organic layer and improve battery performances.

The positive active material may be any compound in which a lithium intercalation reaction occurs, and examples thereof include lithiated compounds including cobalt, manganese, or nickel, known in the lithium ion battery production. The positive active material may comprise at least one compound selected from the groups of compounds represented by formulas 1 to 13.

$$Li_xMn_{1-y}M_yA_2 \quad (1)$$

$$Li_xMn_{1-y}M_yO_{2-z}X_z \quad (2)$$

$$Li_xMn_2O_{4-z}X_z \quad (3)$$

$$Li_xMn_{2-y}M_yA_4 \quad (4)$$

$$Li_xCo_{1-y}M_yA_2 \quad (5)$$

$$Li_xCoO_{2-z}X_z \quad (6)$$

$$Li_xNi_{1-y}M_yA_2 \quad (7)$$

$$Li_xNiO_{2-z}X_z \quad (8)$$

$$Li_xNi_{1-y}Co_yO_{2-z}X_z \quad (9)$$

$$Li_xNi_{1-y-z}Co_yM_zA_\alpha \quad (10)$$

$$Li_xNi_{1-y-z}Co_yM_zO_{2-\alpha}X_\alpha \quad (11)$$

$$Li_xNi_{1-y-z}Mn_yM_zA_\alpha \quad (12)$$

$$Li_xNi_{1-y-z}Mn_yM_zO_{2-\alpha}X_\alpha \quad (13)$$

wherein, $0.95 \leq x \leq 1.1$, $0 \leq y \leq 0.5$, $0 \leq z \leq 0.5$, $0 < \alpha \leq 2$, M is at least one element selected from the group consisting of Al, Ni, Co, Mn, Cr, Fe, Mg, Sr, V, and rare earth elements, A is selected from the group consisting of O, F, S, and P; and X is selected from the group consisting of F, S, and P.

Alternatively, the positive active material may be any compound known in the lithium-sulfur battery, such as elemental sulfur ($S_8$, elemental sulfur), $Li_2S_n$ ($n \geq 1$), an organic sulfur compound, or a carbon-sulfur polymer [$(C_2S_x)_n$, where $x=2.5-50$, $n \geq 2$]. In addition, the positive active material may be $LiFeO_2$, $V_2O_5$, TiS, MoS, an organic disulfide compound, or an organic polysulfide compound.

The resulting rechargeable lithium battery of the present invention has an organic layer on the surface of the negative electrode. The organic layer prevents direct contact of the electrolyte and the negative electrode, which results in the decomposition of the electrolyte. Thus, the rechargeable lithium battery has no deterioration or gas generation caused by such decomposition, so that it exhibits good cycle life characteristics. The organic layer with a uniform thickness has good lithium ion conductivity, rendering good initial charging efficiency.

The rechargeable lithium battery of the present invention will be illustrated in more detail below.

The rechargeable lithium battery includes a positive electrode and a negative electrode in which lithium intercalation reactions occur, and an electrolyte. The electrolyte includes a polymerizable monomer and an organic electrolytic solution. If necessary, the battery may further include a separator interposed between the positive electrode and the negative electrode.

The negative electrode has a surface on which an organic layer is formed by polymerizing the monomer. The organic layer may include acetonitrile (hereinafter, referred as "ACN").

The polymerizable monomer is preferably an anionic polymerizable monomer, such as methacrylonitrile, acrylonitrile or polyacrylate with at least two functional groups. Examples of polyacrylates include acrylate systems with polyether or polyester.

The polymerizable monomer is anionic polymerized at a surface of the negative electrode during the charging, to form an organic layer. The anionic polymerization occurs due to the continuous opening of two double bond in one monomer and reacting each open double bond with another monomer.

The anionic polymerizable monomer is radical polymerized by heating to solidify it, and the degree of the solidification depends on the concentration and type of anionic polymerizable monomer.

The electrolyte includes aprotic solvents and lithium salts dissolved in the solvents. The aprotic solvents may be propylene carbonate, ethylene carbonate, butylene carbonate, benzonitrile, acetonitrile, tetrahydrofurane, 2-methyltetrahydrofurane, γ-butyrolactone, dioxolane, 4-methyldioxolane, N,N-dimethylformamide, dimethylacetoamide, dimethylsulfoxide, dioxane, 1,2-dimethoxyethane, sulforane, dichloroethane, chlorobenzene, nitrobenzene, dimethyl carbonate, methylethyl carbonate, diethyl carbonate, methylpropyl carbonate, methylisopropyl carbonate, ethylbutyl carbonate, dipropyl carbonate, diisopropyl carbonate, dibutyl carbonate, diethyleneglycol, dimethylether, or a mixture thereof. Preferably, the aprotic solvents include one selected from propylene carbonate, ethylene carbonate, and butylene carbonate, and one selected from dimethyl carbonate, methylethyl carbonate, and diethyl carbonate.

The lithium salts may be any material known as supporting salts used in rechargeable lithium batteries, and may be at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein, x and y are natural number), LiCl, and LiI. The lithium salts preferably include one of $LiPF_6$ and $LiBF_4$.

The thin organic thin layer is stable and does not decompose under the mild conditions at which rechargeable lithium batteries are generally used. The thin organic thin layer has a high ionic conductivity of lithium. The organic layer is very thin, having a thickness on the order of several to scores of nm. If the thickness is on the order of several $\mu$m, it is hard for the lithium ions to permeate the layer, so that the charge and discharge reaction is difficult to carry out. A thickness less than 1 nm is not preferable since the shape of the layer is not maintained.

The pulse charging helps to form a thin organic layer with a suitable thickness. The thin organic layer may be formed on a surface of the negative active material or a surface of the lithium metal foil.

The negative electrode includes, for example, a material formed by mixing a negative active material powder and a binder such as polyvinylidene fluoride, and optionally a conductive agent such as carbon black, and shaping it to a plane circle. Examples of the negative active material include carbonaceous materials such as artificial graphite, natural graphite, carbon fiber graphite, graphite meso carbon microbeads, and amorphous carbon. Useful negative active materials include a metal capable of alloying with lithium, and any complex comprising the metal and carbonaceous material. Metals capable of alloying with lithium include Al, Si, Sn, Pb, Zn, Bi, In, Mg, Ga, and Cd. Further, a metal lithium foil may also be used as a negative electrode.

The positive electrode includes, for example, those formed by mixing a positive active material powder and a binder such as polyvinylidene fluoride, and optionally a conductive agent such as carbon black, and shaping it to a sheet or a circle form. Examples of positive active material include a complex oxide of lithium, and at least one element selected from the group consisting of cobalt, manganese, and nickel. Examples include compounds represented by formulas 1 to 13:

$$Li_xMn_{1-y}M_yA_2 \quad (1)$$

$$Li_xMn_{1-y}M_yO_{2-z}X_z \quad (2)$$

$$Li_xMn_2O_{4-z}X_z \quad (3)$$

$$Li_xMn_{2-y}M_yA_4 \quad (4)$$

$$Li_xCo_{1-y}M_yA_2 \quad (5)$$

$$Li_xCoO_{2-z}X_z \quad (6)$$

$$Li_xNi_{1-y}M_yA_2 \quad (7)$$

$$Li_xNiO_{2-z}X_z \quad (8)$$

$$Li_xNi_{1-y}Co_yO_{2-z}X_z \quad (9)$$

$$Li_xNi_{1-y-z}Co_yM_zA_\alpha \quad (10)$$

$$Li_xNi_{1-y-z}Co_yM_zO_{2-\alpha}X_\alpha \quad (11)$$

$$Li_xNi_{1-y-z}Mn_yM_zA_\alpha \quad (12)$$

$$Li_xNi_{1-y-z}Mn_yM_zO_{2-\alpha}X_\alpha \quad (13)$$

where, $0.95 \leq x \leq 1.1$, $0 \leq y \leq 0.5$, $0 \leq z \leq 0.5$, $0 < \alpha \leq 2$, M is at least one element selected from the group consisting of Al, Ni, Co, Mn, Cr, Fe, Mg, Sr, V, and rare earth elements, A is selected from the group consisting of O, F, S, and P; and X is selected from the group consisting of F, S, and P.

The positive active material may be elemental sulfur ($S_8$), $Li_2S_n$ ($n \geq 1$), an organic sulfur compound or a carbon-sulfur polymer [$(C_2S_x)_n$, where $x=2.5$–$50$, $n \geq 2$]. Alternatively, the positive active material may be any compound in which lithium intercalation occurs, such as $LiFeO_2$, $V_2O_5$, TiS, MoS, an organic disulfide compound, or an organic polysulfide compound.

The thin organic layer of the present invention prevents direct contact between the negative electrode and the electrolyte, which results in the prevention of the decomposition of the electrolyte. Such prevention of the decomposition decreases gas generation and prevents deterioration of the electrolyte. In addition, such a decrease in gas generation allows a decrease in the internal pressure of the battery. Furthermore, the charge and discharge reactions actively progress, thereby improving charge and discharge efficiency and cycle life characteristics.

The layer prevents reaction between the electrolyte and the negative electrode so that the electrolyte does not deteriorate and the battery performances, such as charge and discharge efficiency and cycle life characteristics, do not deteriorate even if the battery is kept at a high temperature for a long time.

The good ionic conductivity of lithium of the organic layer allows transfer of lithium ions between the electrolyte and the negative electrode, rendering an improvement in charge and discharge efficiency and cycle life characteristics. Such a good ionic conductivity does not increase internal impedance of the battery and does not significantly decrease the charge and discharge capacity.

A method for preparing a rechargeable lithium battery according to one embodiment of the present invention will be illustrated in more detail. The following method relates to a lithium ion battery, but the present invention is not limited thereto. It can be understood by one of an ordinary skill in the art artisan that the method of the present invention can be applied to any rechargeable lithium battery, such as a lithium-sulfur battery in which the positive active material includes elemental sulfur ($S_8$), $Li_2S_n$ ($n \geq 1$), an organic sulfur compound, or a carbon-sulfur polymer [$(C_2S_x)_n$, where $x=2.5=50$, $n \geq 2$].

A polymerizable monomer is added to an organic electrolyte solution to prepare an electrolyte. ACN may be further added to the electrolyte.

For example, if as the polymerizable monomer, polyethyleneglycol dimethacylate (hereinafter, referred to "PEGDMA") and/or polyethyleneglycol acrylate (hereinafter, referred to "PEGDA") and acrylonitrile (hereinafter, referred to "AN") are used, the amount of PEGDMA and/or PEGDA is preferably 0.5 to 20 wt %, and more preferably 2 to 5 wt %. The amount of AN is preferably 0.1 to 2 wt %, and more preferably 0.2 to 0.5 wt %. The amount of ACN is preferably 0.1 to 5 wt %, and more preferably 0.2 to 1 wt %.

The electrolyte is placed between a positive electrode and a negative electrode to prepare an electrode element. According to the types of the electrolyte (solution type or polymer type), the placing step may be changed. The placing step may be performed by interposing a separator between the positive electrode and the negative electrode, and immersing the same in the electrolyte (solution type), or by interposing the polymer electrolyte between the positive electrode and the negative electrode (polymer type).

The electrode element does not include polymers from the polymerizable monomer.

The electrode element may be heat-treated, thereby adhering the polymerizable monomer to a surface of the negative electrode.

The conditions of the heat-treatment, such as temperature and time, depend on the types of the polymerizable monomer. For example, if PEGDMA and/or PEGDA is used as the polymerizable monomer, the heat-treatment is performed at room temperature to 120° C. According to the heat-treatment, the polymerizable monomer such as PEGDMA and/or PEGDA is radical polymerized to generate a polymer which is adhered to a surface of the negative electrode, and which is immersed in the organic electrolyte solution.

If the temperature is less than room temperature, a special expensive radical initiator is required, or the radical polymerization is insufficient, and if the temperature is more than 120° C., the electrolyte is deteriorated, thereby deteriorating battery performance.

If methacrylonitrile (hereinafter, referred as "MN") is used as the polymerizable monomer, the heat-treatment is performed at 40° C. for 8 hours. According to the heat-treatment, MN is adhered to a surface of the negative electrode.

Figure 3:
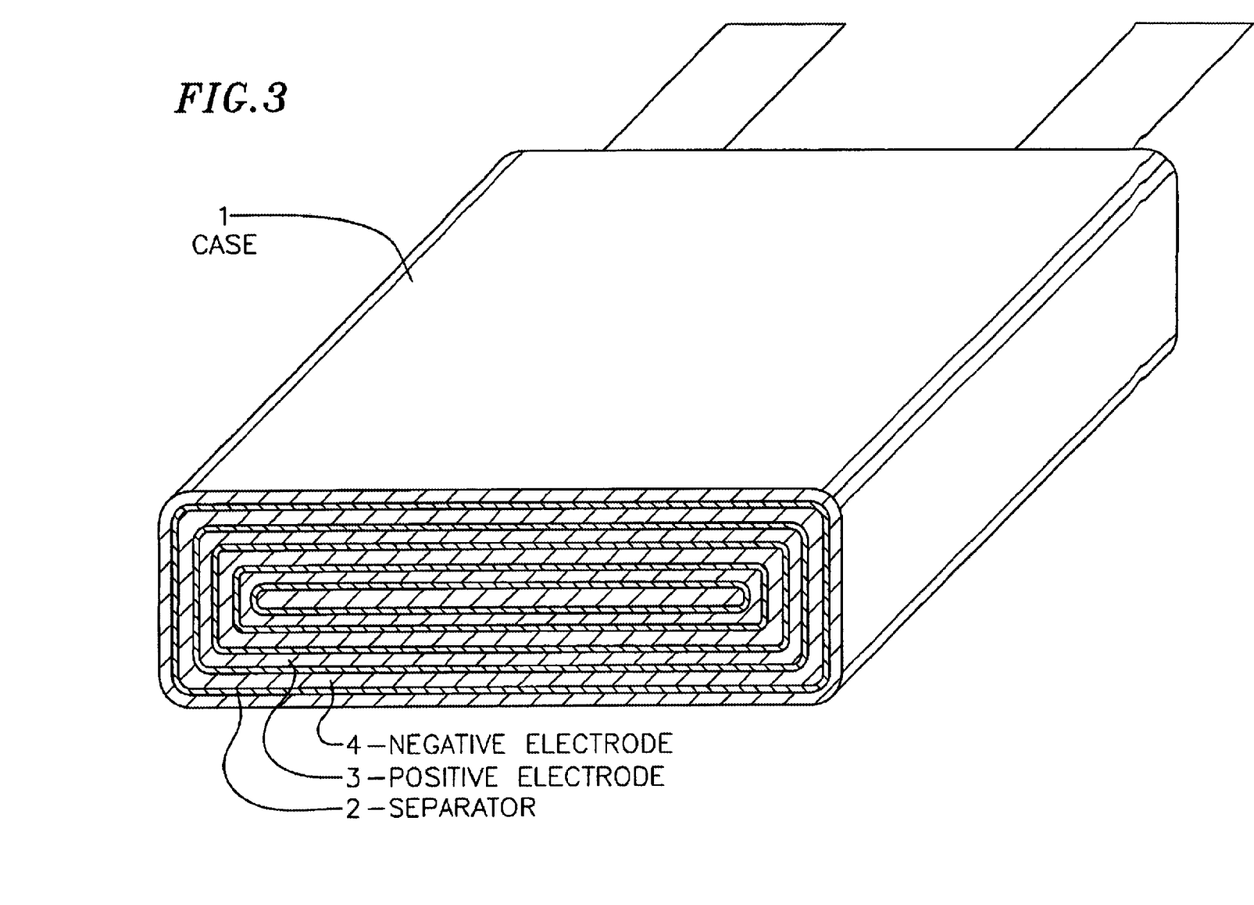
FIG. 3 is a perspective view showing a battery according to the invention.

As shown generally in FIG. 3, the positive electrode 3 and negative electrode 4 along with the separator 2 are put into a case 1 with an electrolyte to fabricate a lithium secondary cell.

A charging procedure according to the present invention will be illustrated in more detail.

The resulting electrode element is charged by applying pulse voltages. The pulse voltages alternatively include a base potential E1 and a pulse potential E2. The base potential E1 is 1.1V to a voltage which occurs when an electrode is immersed in an electrolyte and the pulse potential E2 is 1.1 to 0.7V. The base potential and the pulse potential are values which indicate a voltage difference gap between any material and Li metal. Thus, the potential is not a value indicating characteristics of the full cell. The characteristics of the full cell can be identified by battery voltages. The battery voltage depends on the type of positive active material. The base voltage V1 corresponding to the base potential E1 is 0 to 2.75V, and the pulse voltage V2 corresponding to the pulse potential E2 is 2 to 3.2V in lithium ion batteries. In lithium-sulfur batteries, the base voltage V1 is 0 to 1.0V, and the pulse voltage V2 is 0.5 to 1.5V.

Before or after applying the pulse voltages, a constant current charging may be further performed until the potential of the negative electrode reaches the base potential. The constant current after applying the pulse voltage is refered to as the formation step.

Alternatively, the charging by applying the pulse voltages may be performed by charging the potential of the negative electrode to between the base potential E1 and the pulse potential E2, followed by charging the potential of the negative electrode to between the base potential E3 and the pulse potential E4. The base potential E3 is 0.7 to 0.0V and the pulse potential E4 is 0 to 0.1V. The base voltage V3 corresponding to the base potential E3 is 3.0 to 4.2V, and the pulse voltage V4 corresponding to the pulse potential E4 is 4.0 to 4.3V in lithium ion batteries. In lithium-sulfur batteries, the base voltage V3 is 0.5 to 1.5V, and the pulse voltage V4 is 1.5 to 2.5V.

In the lithium ion battery system, if the base potential E1 is less than 1.1V, the transfer of the electrons to the polymerizable monomer severely occurs.

The charging by applying the pulse voltages is preferably performed for 0.01 to 8 hours.

The application of the pulse potential E2 forms a thin organic layer on a surface of the negative electrode, obtained from the anionic polymerization of the polymerizable monomer before decomposition of the electrolyte.

It is not preferred for the pulse potential E2 to be less than 0.7V, because then decomposition of the electrolyte and anionic polymerization continuously occur. If the pulse potential E2 is more than 1.1V, polymerization of the polymerizable monomer does not occur.

During the application of the pulse voltage, the pulse charging preferably has a square wave shape or a triangle wave shape. Most preferred is the square wave shape since a rise from the base potential E1 to the pulse potential E2 occurs abruptly. Such an abrupt rise effectively controls the transfer of the electrons and initiate polymerization for forming the organic layer on the negative electrode.

The width per one pulse of the pulse potential E2 can be suitably chosen from $1\,\mu$ second to 1000 seconds by using a commercial function generator. In addition, if the base potential is a pulse type, the width per one pulse of the pulse potential E1 can be suitably chosen from $1\,\mu$ second to 1000 seconds.

By applying the pulse voltages, the monomer is polymerized to form a thin organic layer on a surface of the negative electrode, which prevents direct contact between the negative electrode and the electrolyte. Such prevention in turn prevents decomposition of the electrolyte, gas generation, and deterioration of the electrolyte. In addition, the charging by applying a pulse voltage is performed for a long time so that the polymerization of the monomer occurs and the thin organic thin layer can be sufficiently performed.

The pulse-charging is performed by applying voltages required for initiating polymerization at intervals, so that the severe transfer of electrons is prevented and thin organic layers with good ion conductivity of lithium are formed.

ACN increases the ionic conductivity of the lithium of the thin organic layer and decreases the inner impedance of the battery, so that the charge and discharge efficiency are improved and the cycle life characteristics are improved. It is believed that ACN is presented on the organic layer, or in a copolymer derived from the polymerizable monomer in a dissolved state.

The thin organic layer decreases the concentration of the polymerizable monomer and ACN so that the monomer, which deteriorates the battery performances, does not substantially remain.

The resulting electrode element may be further charged at a constant current until the potential of the negative electrode reaches 0.0V to 0.1V. After the constant-current charging, the electrode element may be further charged at a constant voltage for 1 to 8 hours while the potential of the negative electrode is maintained. The current during the constant-current charging is preferably 0.1 to 0.5C. During the constant-current charging, the voltage of a lithium ion battery corresponding to the potential of the negative electrode is 4.0 to 4.3V, while that of a lithium-sulfur battery is 2.0 to 2.5V.

During the constant-current and the constant-voltage charging steps, the electrolyte does not directly contact the negative electrode to prevent the decomposition of the electrolyte, due to the thin organic layer.

If the potential of the negative electrode is more than 0.1V during the constant-current charging, the capacity is insufficient. If it is less than 0.0V, the crystalline structure of the positive electrode may be destroyed.

If the constant-voltage charging is performed for less than 1 hour, the charging is not insufficient. If it is performed for more than 8 hours, the properties of the positive electrode deteriorate.

A pause time of 0.1 to 8 hours is preferably provided between the constant-current and the constant-voltage charging, which helps to sufficiently allow the polymerization to occur.

The following examples illustrate the present invention in further detail. However, it is understood that the present invention is not limited by these examples.

EXAMPLES 1 TO 5

0.2 wt % of MN was mixed with 99.8 wt % of an organic electrolyte solution for 30 minutes to prepare an electrolyte. The organic electrolyte solution comprised 1M $LiPF_6$ in a mixed solution of ethylene carbonate (EC) and dimethyl carbonate (DEC) (3:7 volume ratio).

A positive electrode with a LiCoO2 positive active material and a negative electrode with a carbon fiber negative active material were spirally wound, and the resultant product was inserted into a battery case. The electrolyte was injected into the battery case, and the battery case was sealed. As a result, a prismatic cell with a width of 30 mm, a height of 60 mm, and a thickness of 4 mm was fabricated.

The prismatic cell was heat-treated at 40° C. for 8 hours to adhere MN to a surface of the negative electrode. Thereafter, the heat-treated prismatic cell was constant-current charged at a 0.2C rate until the voltage reached a base voltage V1 as shown in Table 1 (first charging step). Base potentials E1 (a potential to lithium metal) corresponding to the base voltages V1 are presented in Table 1.

The charged cell was charged by alternatively applying the base voltage V1 and a pulse voltage V2 as shown in Table 1 (second charging step). Pulse potentials E2 corresponding to the pulse voltages V2 are presented in Table 1.

The widths of the pulse potential E2, frequencies, and total second charging hours are presented in Table 1

TABLE 1

|  | Example 1 | Example 2 | Example 3 | Example 4 | Example 5 | Comparative Example 1 | Comparative Example 2 |
| --- | --- | --- | --- | --- | --- | --- | --- |
| Base voltage V1 (V) | 2.5 | 2.5 | 2.7 | 2.5 | 2.5 | — | — |
| Base potential E1 (V) | 1.3 | 1.3 | 1.1 | 1.3 | 1.3 | — | — |
| Pulse voltage V2 (V) | 3.0 | 3.0 | 3.0 | 3.0 | 3.0 | — | — |
| Pulse potential E2 (V) | 0.8 | 0.8 | 0.8 | 0.8 | 0.8 | — | — |
| Width of the pulse potential | 0.2 sec. | 0.02 sec. | 500 μsec. | 500 μsec. | 500 μsec. | — | — |
| Frequency | 6 minutes | 1 sec. | 1 sec. | 1 sec. | 1 sec. | — | — |
| Total second charging hours | 60 min. | 1 min. | 1 min. | 10 min. | 60 min. | — | — |
| Initially charging efficiency | 85.9 | 85.3 | 86.2 | 86.0 | 86.4 | 84.5 | 85.0 |

Figure 1:
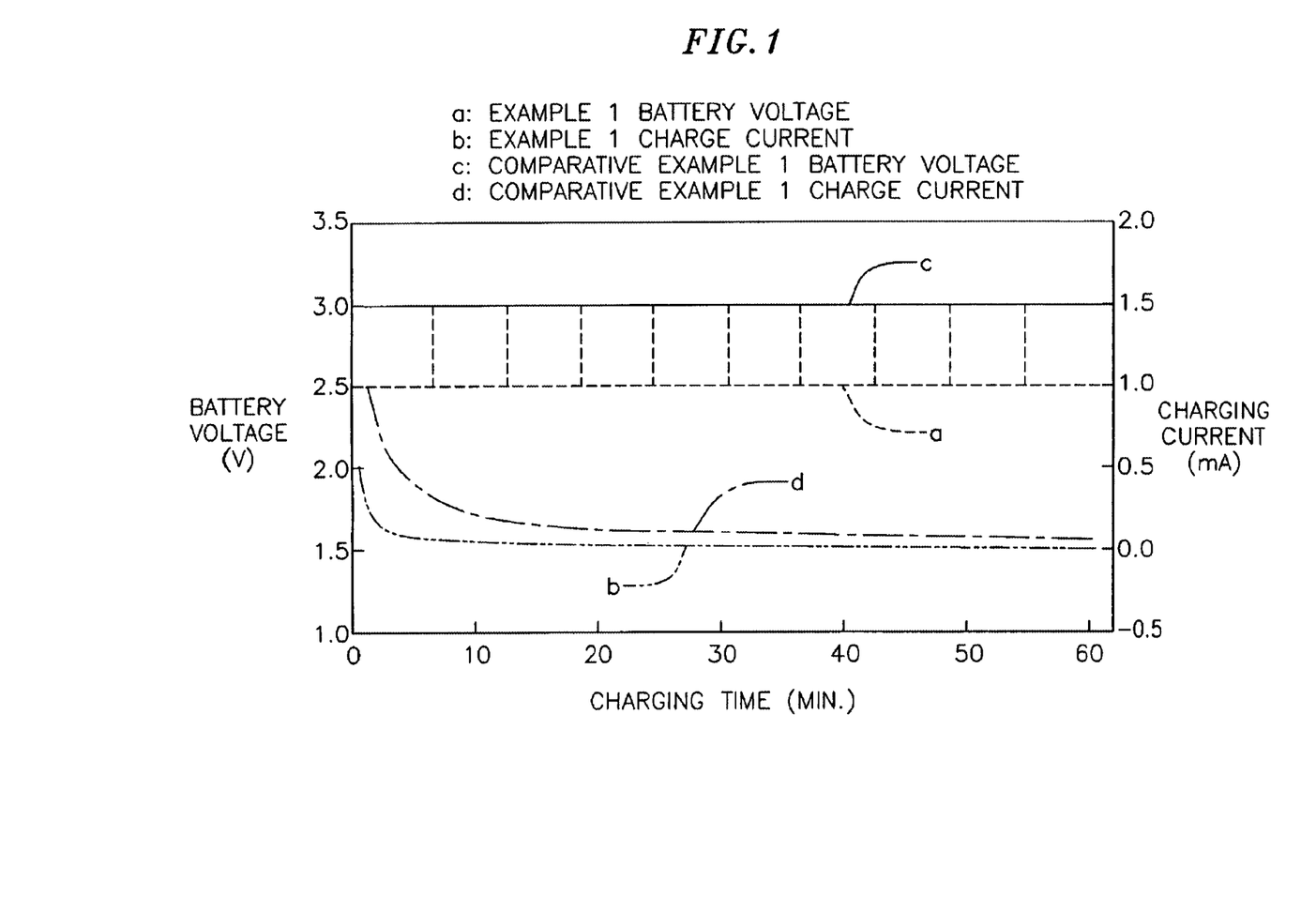
FIG. 1 is a graph showing charge voltage and charging current of rechargeable lithium cells according to Example 1 of the present invention and Comparative Example 2.

FIG. 1 shows a plot of battery voltage (a) and charging current (b) corresponding to each voltage according to Example 1.

The resulting cell was constant-current charged to 4.2C (corresponding to 0.1C of the potential of the negative electrode to lithium metal) at 0.2C (third charging), and was then constant voltage charged for 12 hours (fourth charging).

COMPARATIVE EXAMPLE 1

A prismatic cell was fabricated by the same procedure as in Example 1. The cell was heat-treated at 40° C. for 8 hours. The prismatic cell was heat-treated at 40° C. for 8 hours to adhere MN on the negative electrode.

The heat-treated cell was constant current charged to 3V of a battery voltage (corresponding to 0.8V of the potential of the negative electrode to lithium metal) at 0.2C and was then constant voltage charged for 4 hours. As a result, MN was polymerized to form a thin organic layer on the negative electrode. The charging current was obtained as shown in "d" of FIG. 1. Thereafter, the resulting cell was constant-current charged to 4.2V (corresponding to 0.1V of the potential of the negative electrode to lithium metal) at 0.2C, and was then constant-voltage charged for 12 hours.

As shown in FIG. 1, the charging current (b) according to Example 1 is smaller than that (a) according to Comparative Example 1.

Comparative Example 2

A prismatic cell was fabricated by the same procedure as in Example 1 except that MN was not added. The prismatic cell was heat-treated at 40° C. for 8 hours. The heat-treated cell was constant-current charged to 4.2V (corresponding to 0.1V of the potential of the negative electrode to lithium metal) at 0.2C and was then constant-voltage charged for 12 hours.

First Charge Efficiency

The first charge efficiencies of the cells according to Example 1 and Comparative Examples 1 and 2 were measured. The first charge efficiency was obtained from the division of discharge capacity by charge capacity at the first charge and discharge cycle. The results are presented in Table 1.

The first charge efficiency of the cell according to Comparative Example 2 was 85.0% and that according to Comparative Example 1 was 84.5%. The reason why the first charge efficiency of Comparative Example 1 is smaller than Comparative Example 2 is that the heavy polymerization of Comparative Example 1 caused a decrease in the ionic conductivity of the lithium ions.

The first charge efficiencies of the cells according to Examples 1 to 5 were 86.4 to 85.3%, and they were superior to Comparative Example 2. The result was believed to be because the charging by applying pulse voltage prevents the heavy electron transfer, and the thin organic layer has good ionic conductivity of lithium.

Cycle Life Characteristics

Figure 2:
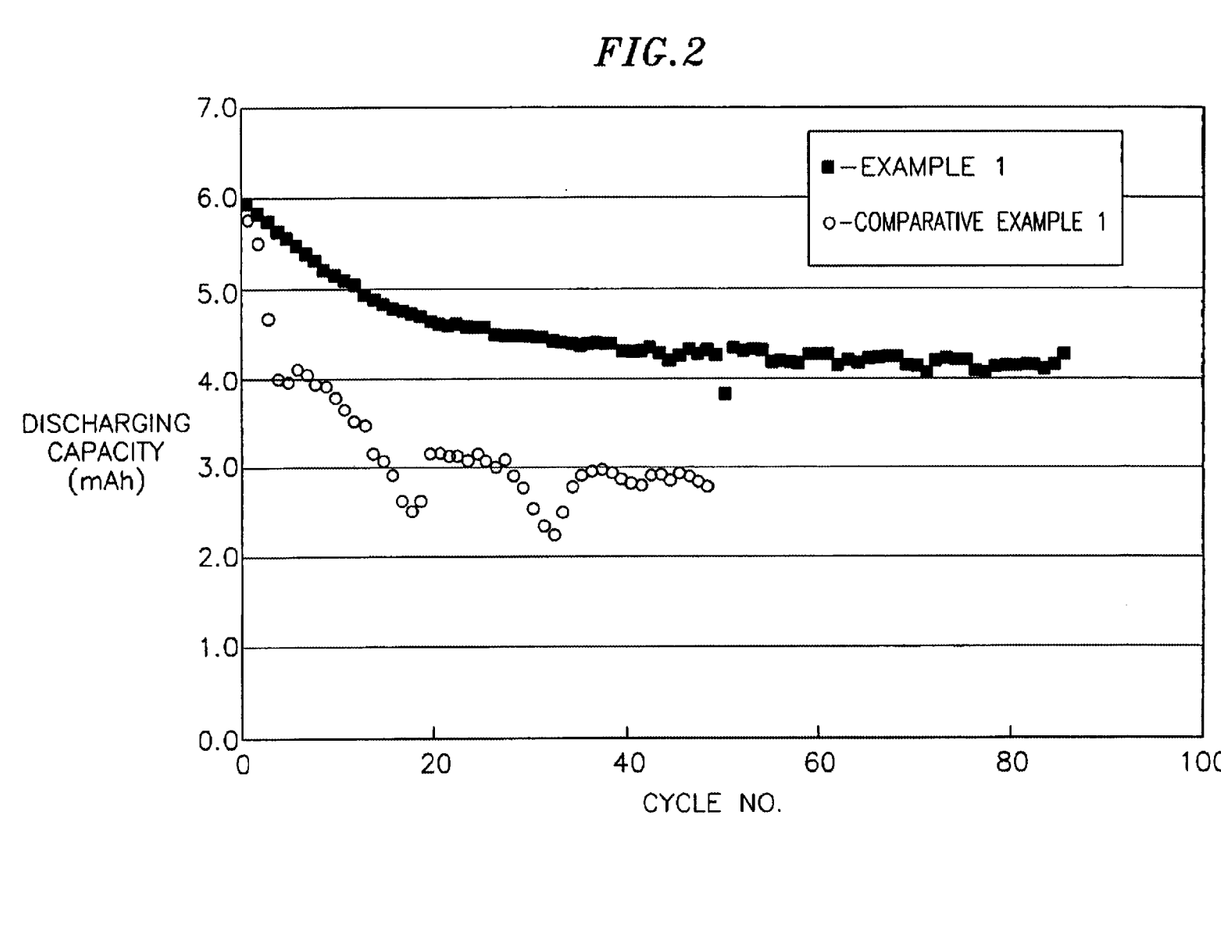
FIG. 2 is a graph showing cycle life characteristics of rechargeable lithium cells according to Example 1 of the present invention and Comparative Example 2.

The cells according to Example 1 and Comparative Example 2 were constant-current discharged to 2.5V at 1.0C for 2 cycles, and were then constant-current charged to 4.2V at 0.5C followed by constant-voltage charging at 4.2V for 2 hours. The results are presented in FIG. 2. It can be seen from FIG. 2 that the cell according to Example 1 exhibited superior cycle life characteristics to that of Comparative Example 2.

As described above, the method of fabricating a rechargeable lithium battery according to the present invention can prevent heavy electron transfer to anionic polymerizable monomers by alternatively applying the pulse potential E2 and the base potential E1. The method can form a uniform thin organic layer with good ionic conductivity of lithium on the negative electrode. Thus, the method can be used to fabricate a rechargeable lithium battery exhibiting good battery performances such as capacity, stability, cycle life, and low temperature characteristics.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of fabricating a rechargeable lithium battery, comprising:
   placing an electrolyte comprising a polymerizable monomer between a positive electrode and a negative electrode to prepare an electrode element; end
   pulse charging the electrode element.

2. The method of claim 1 wherein the pulse charging is performed by alternatively applying a base potential E1 and a pulse potential E2 to the negative electrode,
   the potential being a voltage which is proportional value to a lithium metal reference electrode potential,
   the base potential E1 being a potential at which the transfer of electrons from the negative electrode to the polymerizable monomer does not occur, and
   the pulse potential E2 being a potential at which the transfer of electrons from the negative electrode to the polymerizable monomer occurs.

3. The method of claim 1 wherein constant-current charging is further performed until to a base potential E1 before the pulse charging,
   the base potential E1 being a potential at which the transfer of electrons from the negative electrode to the polymerizable monomer does not occur.

4. The method of claim 1 wherein the pulse charging is performed by alternatively applying a base potential E1 and a pulse potential E2; end
   by alternatively applying a base potential E3 and a pulse potential E4, and wherein the base potential E1 is a potential at which the transfer of electrons from the negative electrode to the polymerizable monomer does not occur;
   the pulse potential E2 is a potential at which the transfer of electrons from the negative electrode to the polymerizable monomer occurs,
   the base potential E3 is a potential at which a constant-current charge occurs, and
   the pulse potential E4 is a potential at which a constant-voltage charge occurs.

5. The method of claim 1 wherein constant-current charging is further performed until to a base potential E1 after the pule charging,
   the base potential E1 being a potential at which the transfer of electrons from the negative electrode to the polymerizable monomer does not occur.

6. The method of claim 1 wherein the pulse charging has a pulse potential with a width of 1 $\mu$ second to 1000 seconds.

7. The method of claim 1 wherein the pulse charging is performed for 0.01 to 8 hours.

8. The method of claim 1 further comprising heat-treating the electrode, at room temperature to 120° C. before pulse charging.

9. The method of claim 1 further comprising constant-current charging the electrode element when a potential of the negative electrode to a lithium metal reference electrode reaches a predetermined potential E5; and
   constant-voltage charging the resulting electrode element while the potential is maintained the potential E5.

10. The method of claim 1 wherein a difference gap between the base potential E1 and the pulse potential E2 is at least 0.2V.

11. The method of claim 1 wherein the pulse charging has a square wave shape or a triangle wave shape.

12. The method of claim 1 wherein the base potential E1 is 1.1V to a nominal potential, and the pulse potential E2 is 0.7 to 1.1V.

13. The method of claim 1 wherein the base voltage V1 is 0 to 2.75V and the pulse voltage V2 is 2 to 3.2V.

14. The method of claim 1 wherein the monomer is at least one anionic polymerizable monomer.

15. The method of claim 14 wherein the anionic polymerizable monomer is selected from the group consisting of methacrylonitrile, acrylonitrile, polyacrylates composed of polyether or polyester, and a mixture thereof.

16. The method of claim 1 wherein the electrolyte further comprises acetonitrile.

17. The method of claim 1 wherein the positive active material is at least one lithiated intercalation compound.

18. The method of claim 1 wherein the positive active material is selected from the group consisting of elemental sulfur ($S_8$), $Li_2S_n$ ($n \geq 1$), organic sulfur compounds, a carbon-sulfur polymer [$(C_2S_x)_n$, where x=2.5–50, n$\geq$2], and a mixture thereof.

19. A rechargeable lithium battery fabricated by placing an electrolyte comprising a polymerizable monomer between a positive electrode and a negative electrode to prepare an electrode element; and
   pulse charging the electrode element.

20. A method of fabricating a rechargeable lithium battery comprising:
   placing an electrolyte comprising a polymerizable monomer between a positive electrode and a negative electrode to prepare an electrode element; and
   pulse charging the electrode element.

21. The method of claim 20 wherein the pulse charging is performed by alternatively applying a base voltage V1 and a pulse voltage V2; and wherein the base voltage V1 is a voltage at which the transfer of electrons from the negative electrode to the polymerizable monomer does not occur, and the pulse voltage V2 is a voltage at which the transfer of electrons from the negative electrode to the polymerizable monomer occurs.

22. The method of claim 20 further comprising constant-current charging the electrode element until a battery voltage reaches a base voltage V1 before pulse charging, the base voltage being a voltage at which the transfer of electrons from the negative electrode to the polymerizable monomer does not occur.

23. The method of claim 20 wherein the pulse charging is performed by alternatively applying a base voltage V1 and a pulse voltage V2 to the electrode element; and by alternatively applying a base voltage V3 and a pulse voltage V4 to the resulting electrode element, the base voltage V1 being a voltage at which the transfer of electrons from the negative electrode to the polymerizable monomer does not occur, the pulse voltage V2 being a voltage at which the transfer of electrons from the negative electrode to the polymerizable monomer occur, the base voltage V3 being at a region at which the charging is performed by a constant-current mode, and the pulse voltage V4 being at a region at which the charging is performed by a constant-voltage mode.

24. The method of claim 20 further comprising constant-current charging the electrode element until a battery voltage reaches a base voltage V1 after pulse charging, the base voltage V1 being a voltage at which the transfer of electrons from the negative electrode to the polymerizable monomer does not occur.

25. The method of claim 20 wherein the pulse charging has a pulse potential with a width of $1\mu$ second to 1000 seconds.

26. The method of claim 20 wherein the pulse charging is performed for 0.01 to 8 hours.

27. The method of claim 20 further comprising heat-treating the electrode element at room temperature to 120° C. before pulse charging.

28. The method of claim 20 further comprising constant current charging the electrode element until a negative electrode reaches a predetermined voltage V5, and constant-voltage charging the resulting electrode element while the potential is maintained at the voltage V5, after pulse charging.

29. The method of claim 20 wherein a gap between the base voltage V1 and the pulse voltage V2 is at least 0.2V.

30. The method of claim 20 wherein the pulse charging has a square wave shape or a triangle wave shape.

31. The method of claim 20 wherein the base voltage V1 is 0 to 2.75V and the pulse voltage V2 is 2 to 3.2V.

32. The method of claim 20 wherein the base voltage V3 is 3.0 to 4.2V and the pulse voltage V4 is 4.0 to 4.3V.

33. The method of claim 20 wherein the monomer is at least one anionic polymerizable monomer.

34. The method of claim 33 wherein the anionic polymerizable monomer is at least one selected from the group consisting of methacrylonitrile, acrylonitrile, and polyacrylates composed of polyether or polyester.

35. The method of claim 20 wherein the electrolyte further includes acetonitrile.

36. The method of claim 20 wherein the positive active material is at least one lithiated intercalation compound.

37. The method of claim 20 wherein the positive active material is selected from the group consisting of elemental sulfur ($S_8$), $Li_2S_n$ (n$\geq$), organic sulfur compound, carbon-sulfur polymer [$(C_2S_x)_n$, where x=2.5–50, n$\geq$2], and a mixture thereof.

38. A rechargeable lithium battery fabricated by placing an electrolyte comprising a polymerizable monomer between a positive electrode and a negative electrode to prepare an electrode element; and pulse charging the electrode element.

* * * * *